(12) United States Patent
Crane

(10) Patent No.: US 11,090,992 B2
(45) Date of Patent: Aug. 17, 2021

(54) COUPLING DEVICE

(71) Applicant: Lovells Springs Pty Ltd, Carrington (AU)

(72) Inventor: Simon Crane, Carrington (AU)

(73) Assignee: Lovells Springs Pty Ltd, Carrington (AU)

(*) Notice: Subject to any disclaimer, the term of this patent is extended or adjusted under 35 U.S.C. 154(b) by 111 days.

(21) Appl. No.: 16/155,351

(22) Filed: Oct. 9, 2018

(65) Prior Publication Data
US 2019/0105955 A1    Apr. 11, 2019

(30) Foreign Application Priority Data

Oct. 10, 2017  (AU) ............................ 2017101354

(51) Int. Cl.
| B60D 1/60 | (2006.01) |
| B60D 1/01 | (2006.01) |
| B60D 1/02 | (2006.01) |

(52) U.S. Cl.
CPC .............. B60D 1/605 (2013.01); B60D 1/01 (2013.01); B60D 1/025 (2013.01)

(58) Field of Classification Search
CPC ........... B60D 1/01; B60D 1/025; B60D 1/605
USPC .......................................................... 280/514
See application file for complete search history.

(56) References Cited

U.S. PATENT DOCUMENTS

| 6,540,426 B2* | 4/2003 | Cloyd ...................... B60D 1/06 |
| | | 280/511 |
| 8,827,300 B2* | 9/2014 | Allsop ..................... B60D 1/52 |
| | | 280/511 |

* cited by examiner

*Primary Examiner* — Minnah L Seoh
*Assistant Examiner* — Felicia L. Brittman
(74) *Attorney, Agent, or Firm* — Merchant & Gould P.C.

(57) ABSTRACT

A coupling device for coupling a first vehicle to a second towed vehicle includes a pillar for mounting to a towbar of the first vehicle, the pillar defining a primary longitudinal axis and including an upper portion, a lower portion adapted for engagement with the towbar of the first vehicle, and an intermediate portion including a radially protruding locking flange, a coupling body adapted for sleeved engagement with the upper portion of the pillar, the coupling body including at least one locking device for locking the coupling body to the locking flange of the pillar, and a rotary cap operatively associated with the at least one locking device and adapted for rotation relative to the coupling body. Rotation of the rotary cap causes the locking device to pivot between at least a locked position and an unlocked position.

20 Claims, 11 Drawing Sheets

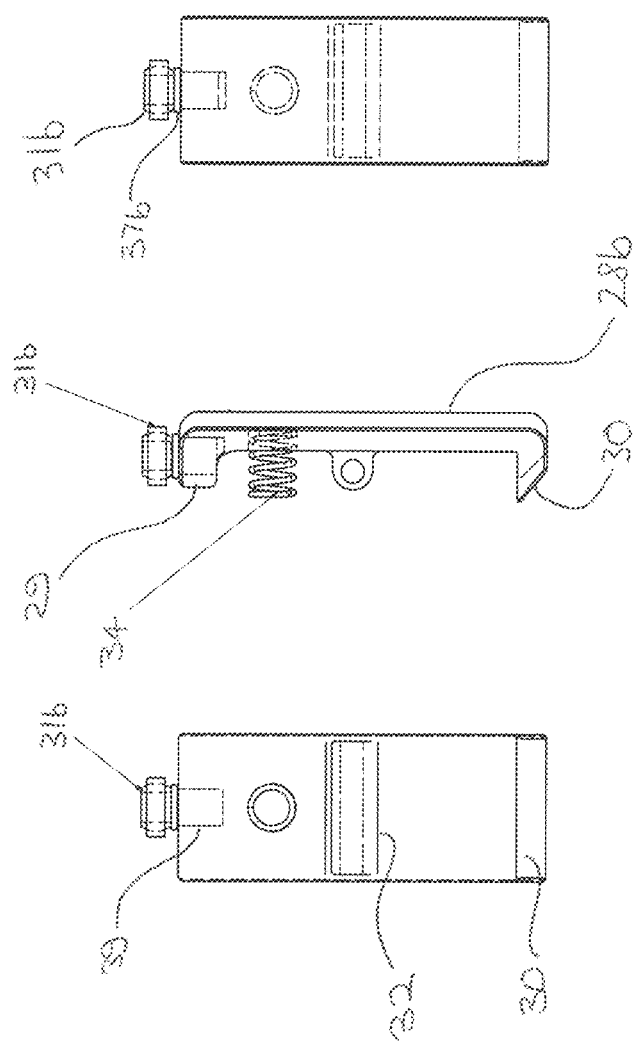

COUPLING DEVICE

This application claims the benefit of Serial No. 2017101354, filed 10 Oct. 2017 in Australia, and which application is incorporated herein by reference. To the extent appropriate, a claim of priority is made to the above-disclosed application.

The present invention relates to a coupling device for coupling a first vehicle to a second towed vehicle. The coupling device can be used to connect a first powered vehicle such as an automobile, truck or locomotive to a second towed vehicle such as a trailer for use both on and off-road.

BACKGROUND

Coupling devices have been developed over the last 120 years to connect locomotives and wagons, trucks and automobiles to towed vehicles and trailers on rail, road and off-road. Known coupling device technologies have generally been categorized by the following characteristics:

Ball and Socket

Many products involving a ball-type coupling are in service, wherein a spherically topped post attached to either the towed or towing vehicle engages with a socket-shaped receptacle on the other vehicle. Retention of the ball in the socket is by a tongue secured to the socket under the spherically topped post which prevents unintended separation of the vehicles. The basic configuration offers good strength and low cost and simplicity with poor articulation angles in the vertical plane. Automatic primary locking is difficult to provide, but possible.

Pintel Ring and Hook Mechanism

Dominant in the medium truck and military sectors, the towing vehicle includes a hook with additional retaining latch, over which a ring fitting attached to the towed vehicle is fitted. The required clearance between ring and hook necessitates high noise levels and impact vibration during the transition from motoring to braking by the tractive towing vehicle. Such noise levels and impact vibration are, however, generally not acceptable in the passenger vehicle market. Automatic primary locking is easy to provide, but uncoupling is very difficult under residual axial (fore-and-aft) load. The high strength, low cost and low maintenance of this type of coupling in dirty conditions make it ideal for military applications.

Pin-Based Mechanisms

Pin based mechanisms by definition require that a hitching pin be inserted to couple the towing vehicle to the towed vehicle. Alignment of a set of holes in a forward part of the coupling with a set of holes or hole in the rear coupling is often difficult, and withdrawal of the pin under load can be very difficult. Mechanisms for mechanically inserting and removing the hitching pin can be added, for extra levels of cost, weight and complexity, but to date they are not automatic upon hitch-up, therefore automatic primary locking is not possible. Vertical articulation is non-existent unless a separate horizontal second axis of articulation is added to the mechanism. Noise levels and costs are low, at least until mechanical wear elongates the pin holes, and operation in dirty conditions is good.

Pillar-Based Systems

A range of pillar and cup mechanisms are available, which depend on a locking female or cup-type mechanism engaging onto a male post or pillar of non-cylindrical shape, allowing locking elements in the cup inner surface to engage in generally concave features on the post or pillar. A range of these mechanisms are available, some with a cone shaped post and tongue and groove locking mechanism, and others with a cylindrical post with groove contour and spherical locking elements engaging in the groove. Both variations of this type of mechanism can be provided with automatic primary locking, but do not react well to high levels of dust or mud on or in the mechanism. All pillar-based systems require a horizontal secondary axis of articulation to provide a high degree of vertical articulation of the second towed vehicle relative to the first towing vehicle.

SUMMARY OF THE INVENTION

Embodiments of a coupling device for coupling a first vehicle to a second towed vehicle comprise: a pillar for mounting to a towbar of the first vehicle, the pillar defining a primary longitudinal axis and including an upper portion, a lower portion adapted for engagement with the towbar of the first vehicle, and an intermediate portion including a radially protruding locking flange, a coupling body adapted for sleeved engagement with the upper portion of the pillar, the coupling body including at least one locking device for locking the coupling body to the locking flange of the pillar, and a rotary cap operatively associated with the at least one locking device and adapted for rotation relative to the coupling body, whereby rotation of the rotary cap causes the at least one locking device to pivot between at least a locked position in which the coupling body is prevented from disengaging from the locking flange of the pillar and an unlocked position in which the coupling device is free to disengage from the locking flange of the pillar.

In some embodiments, the rotary cap includes an upper surface and an opposing lower surface, and at least one cam surface in the lower surface thereof, the at least one cam surface adapted for receiving therein a cam follower associated with the at least one locking device for movement of the cam follower within the at least one cam surface upon rotation of the rotary cap to move the at least one locking device between at least the locked position and the unlocked position.

In some embodiments, the at least one locking device further includes a cam follower adapted to move within the cam surface of the rotary cap upon rotation thereof to move the at least one locking device between at least the locked and unlocked positions. In some embodiments, the cam follower is a ball bearing.

In some embodiments, the at least one locking device is a latch having an upper portion configured for engagement with the rotary cap and a lower portion configured for selective locking engagement with the locking flange of the pillar, the latch being pivotably attached to the coupling body for movement between at least the locked position and the unlocked position upon rotation of the rotary cap. In embodiments, the at least one locking device comprises a pair of the said locking devices.

In some embodiments, the at least one locking device has a release position in between the locked position and the unlocked position, in which position the at least one locking device is engageable with the locking flange of the pillar but cannot be disengaged therefrom.

In some embodiments, the at least one locking device includes a biasing member for biasing the at least one locking device towards the locked position when the at least one locking device is in the release position.

In some embodiments, the coupling body is generally annular and has a female inner surface adapted for receiving the pillar therein with a substantially mating fit, whereby the rotary cap is rotatable with respect to the coupling body only when the pillar is fully engaged within the female inner surface of the coupling body.

In some embodiments, an upper surface of the coupling body includes at least one detent therein and the rotary cap includes at least one protrusion for selective engagement with the detent, whereby when the pillar is not fully engaged within the female inner surface of the coupling device, the protrusion is engaged in the detent preventing rotational movement of the rotary cap and, as the pillar is fully engaged within the female inner surface of the coupling body, the protrusion is caused to disengage from the detent permitting rotational movement of the rotary cap.

In some embodiments, the pillar includes a domed portion in an upper surface thereof that is operatively associated with the rotary cap, and the coupling device includes a resilient member adapted for biasing the protrusion of the rotary cap in the detent, wherein as the pillar is fully engaged within the female inner surface of the coupling body, the domed portion causes the compression of the resilient member so as to lift the protrusion sufficiently out of the detent to disengage it therefrom.

In some embodiments, the coupling device includes a helical resilient member having a first end attached to the rotary cap and a second end attached to the coupling body for biasing the rotary cap in the locked position.

In some embodiments, the coupling device includes a yoke connector pivotably connected to the coupling body to permit pitching movement of the second towed vehicle relative to the first vehicle about a secondary axis that is perpendicular to the primary longitudinal axis of the pillar.

In some embodiments, the coupling device includes an elongate rod connected to the yoke connector and a hitch body for connection to the second towed vehicle, wherein the elongate rod is operatively associated with the hitching body for rotational movement relative thereto about a tertiary axis that is perpendicular to both the primary and secondary axes, to permit rolling movement of the second vehicle about the tertiary axis.

BRIEF DESCRIPTION OF THE DRAWINGS

A preferred embodiment of the invention will hereinafter be described, by way of example only, with reference to the following drawings, as follows:

FIG. 7a is a detailed rear view of a latching bar assembly of the coupling device;

FIG. 7b is a detailed side view of the latching bar assembly of FIG. 7a;

FIG. 7c is a detailed front view of the latching bar assembly of FIG. 7a;

DETAILED DESCRIPTION OF A PREFERRED EMBODIMENT

Figure 1:
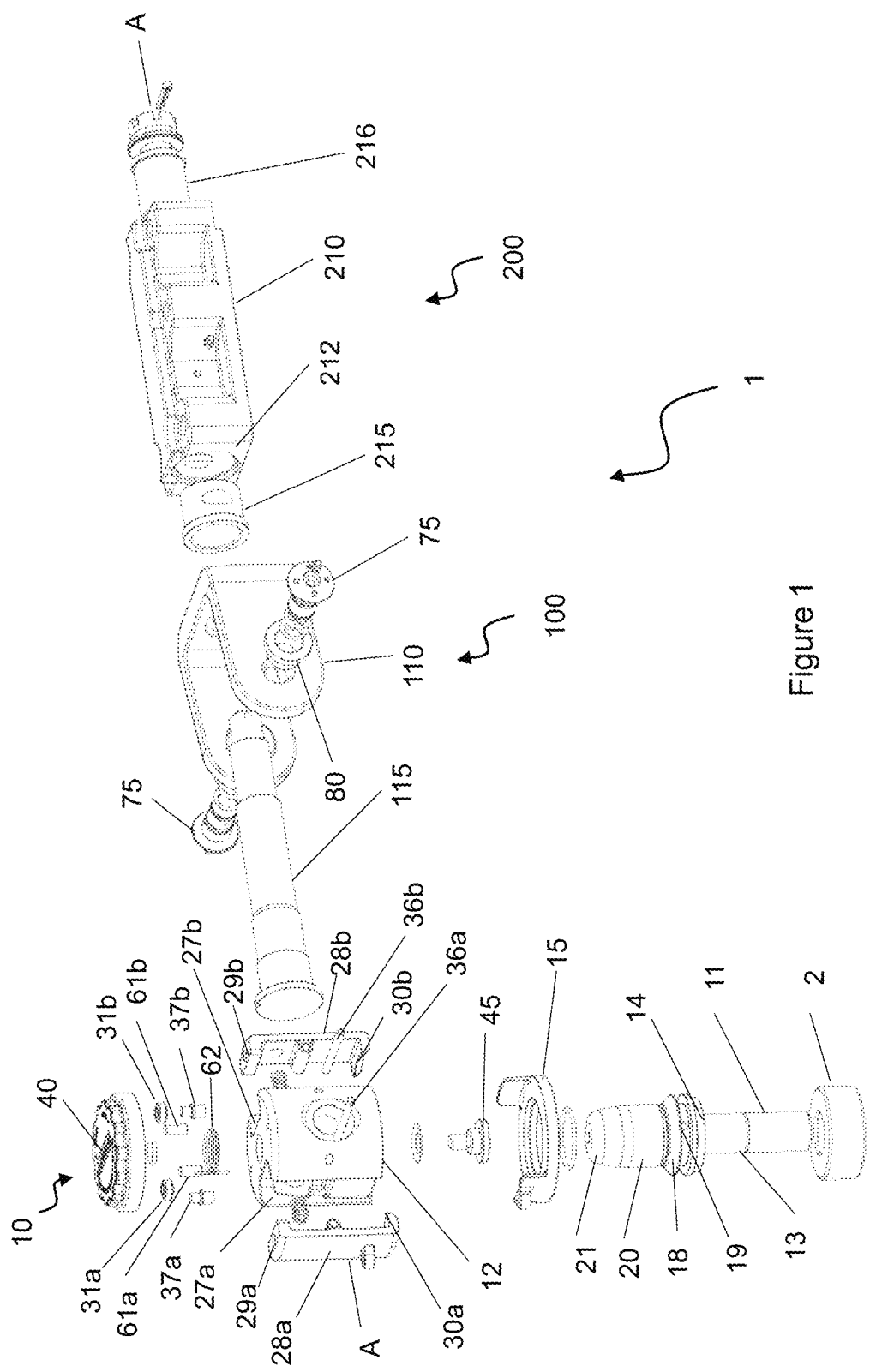
FIG. 1 is an exploded upper perspective view of a preferred embodiment of a coupling device.
Figure 1A:
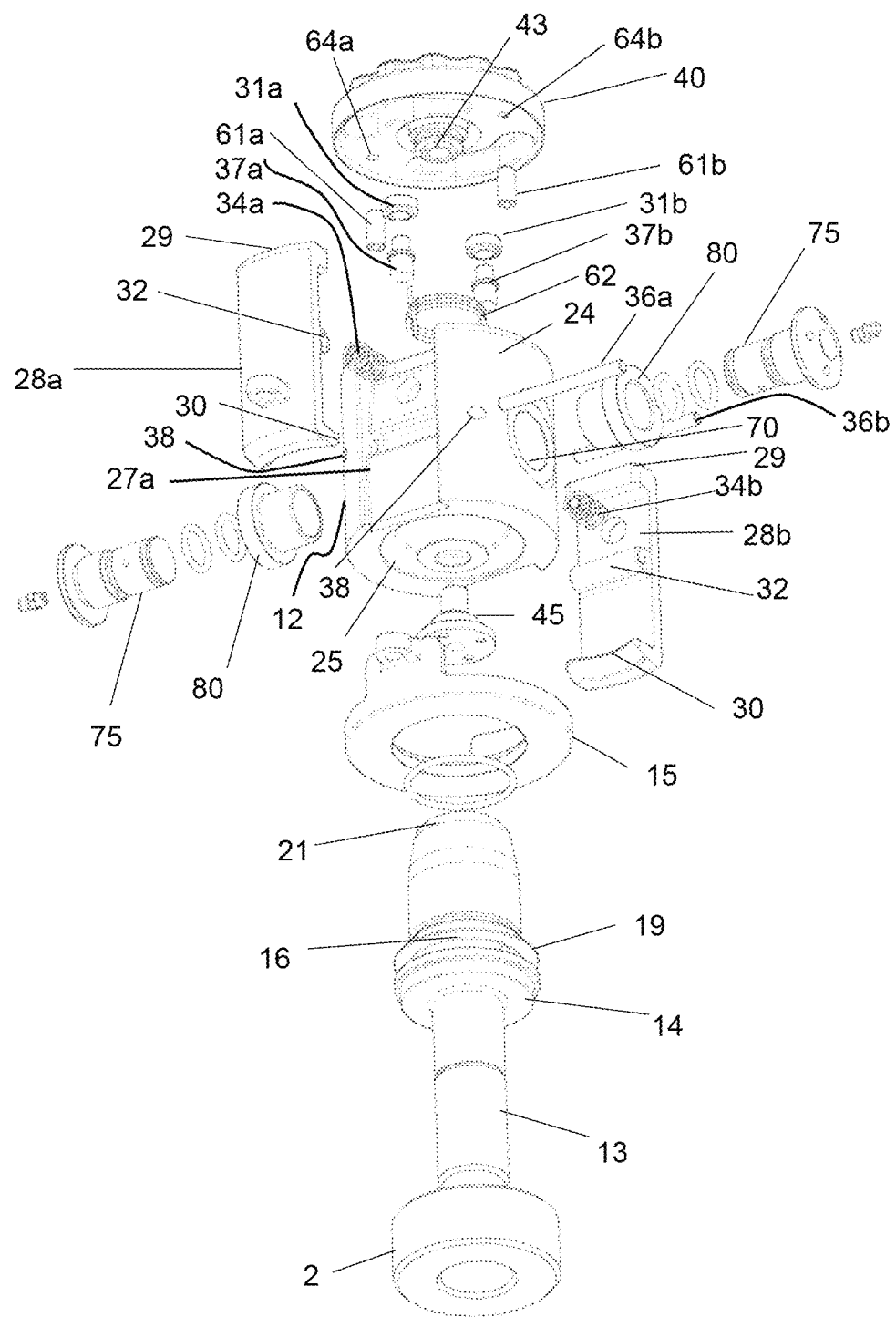
FIG. 1A is an exploded lower perspective view of the coupling device of FIG. 1 showing the coupling body, rotary cap, pillar and latching bars in greater detail.

An embodiment of a coupling device 1 is shown in FIGS. 1 to 10. FIG. 1 shows the components of the coupling device 1 in an exploded configuration. The coupling device 1 comprises a primary axis assembly 10 including an elongate post or pillar 11 oriented vertically as it would be in use, a generally annular cylindrical coupling body 12 and a locking mechanism for locking the coupling body 12 to the pillar 11. The coupling device 1 further includes a secondary axis assembly 100 including a yoke connector 110, and a tertiary axis assembly 200.

Figure 2:
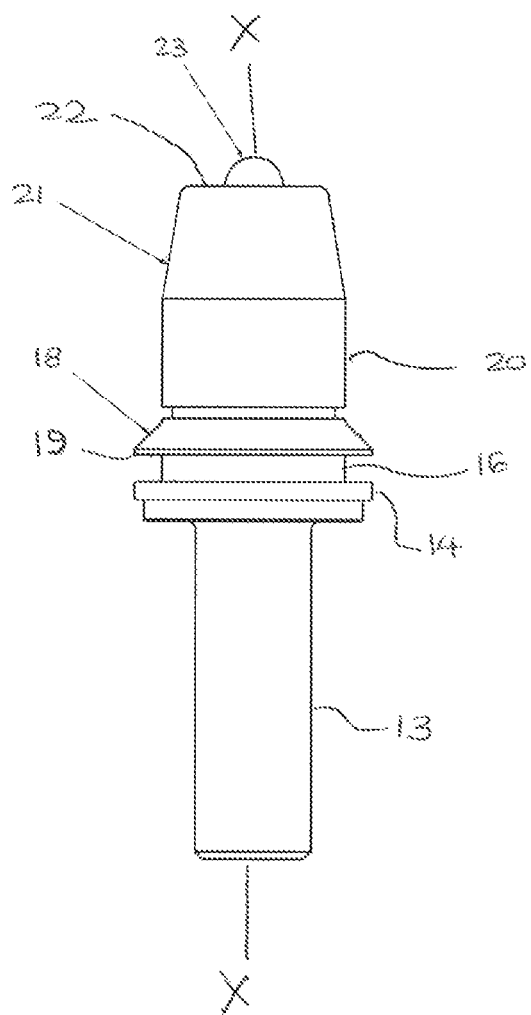
FIG. 2 is a vertical sectional view of the pillar of the coupling device of FIG. 1.
Figure 3:
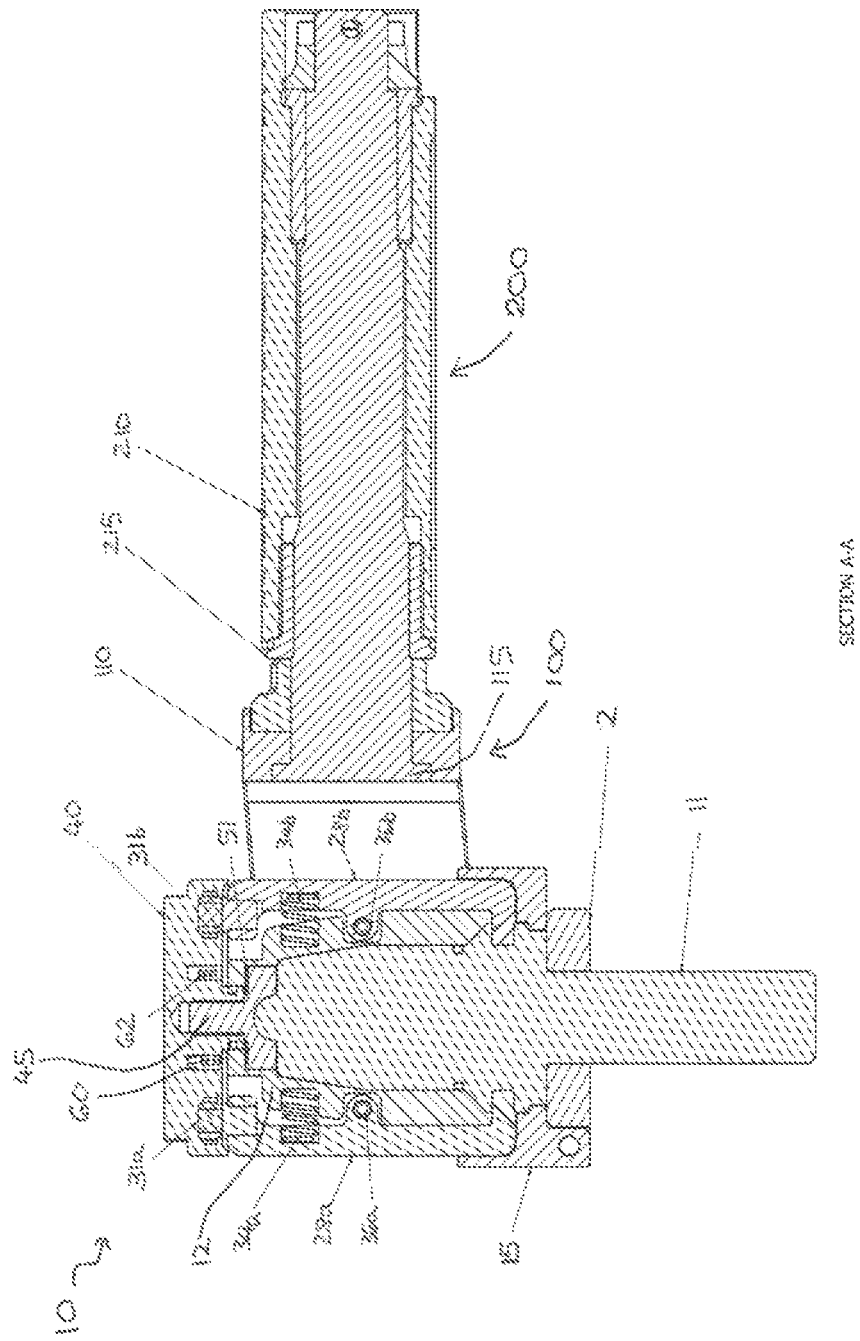
FIG. 3 is a vertical sectional view of the coupling device through the lines A-A as shown in FIG. 1.
Figure 4:
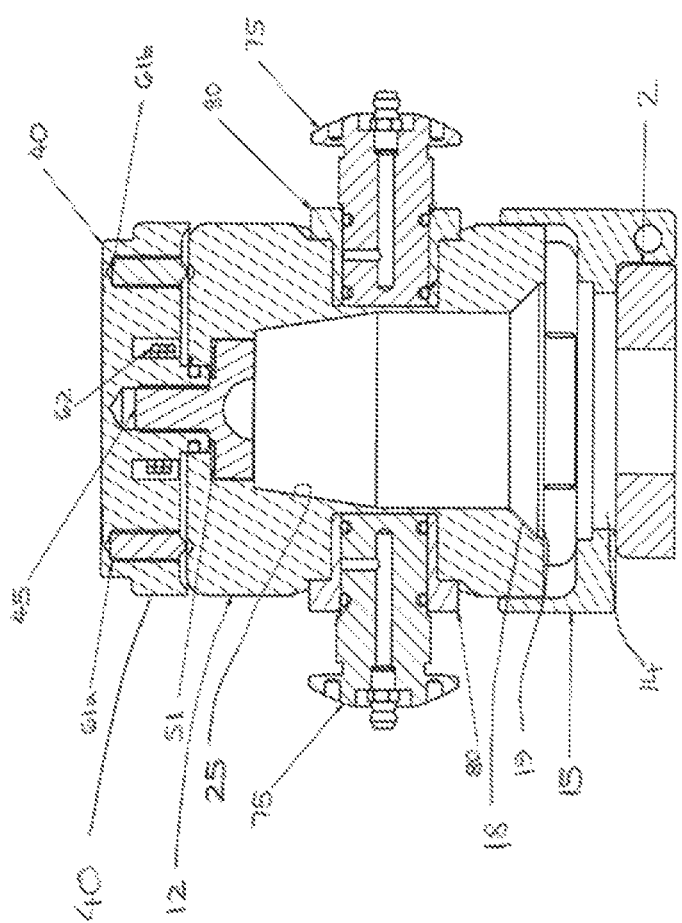
FIG. 4 is a vertical sectional view of the coupling body and rotary cap shown in FIG. 1.
Figure 5:
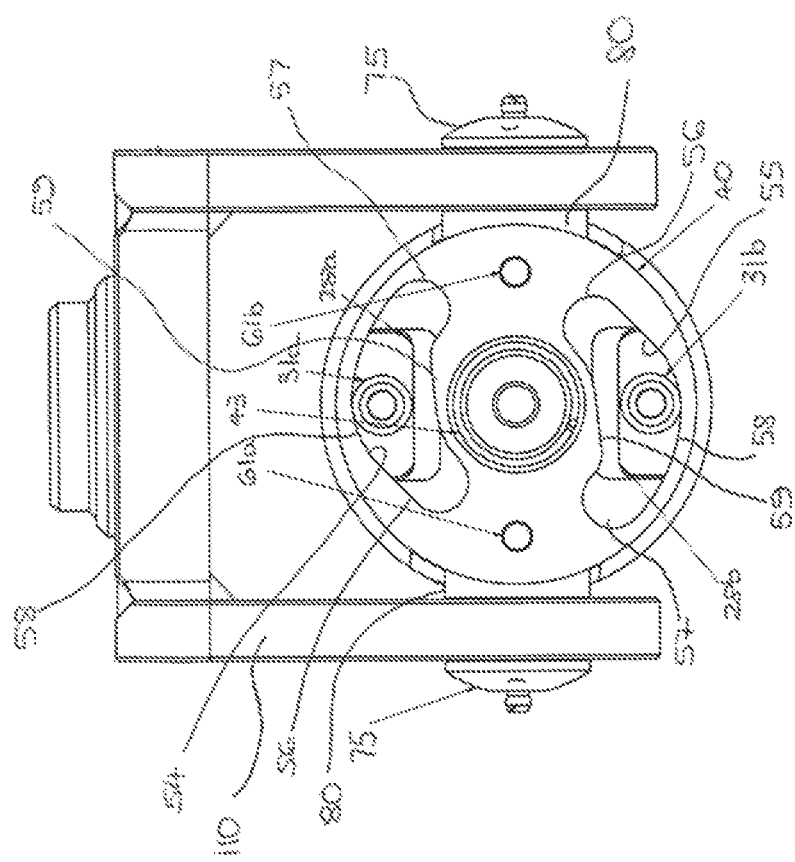
FIG. 5 is a horizontal sectional view of the rotary operating cap through the line C-C as shown in FIG. 1.
Figure 10:
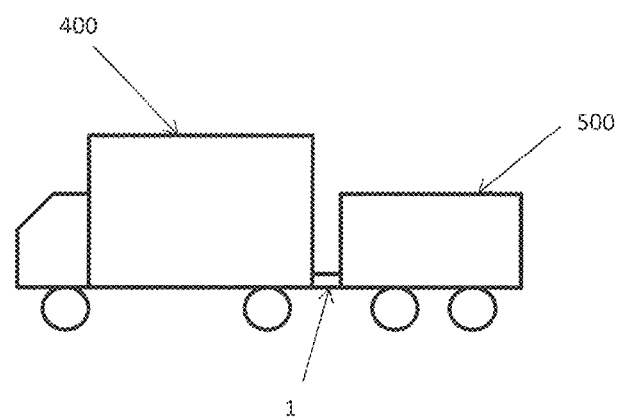
FIG. 10 is a schematic representation of the coupling device attached to a first towing vehicle and a second towed vehicle.

As best seen in FIG. 1 and FIG. 2, the pillar 11 is axisymmetric about a longitudinal axis X-X thereof (axis seen in FIG. 2) and is adapted for attachment to a towbar loop 2 of a first towing vehicle 400, seen schematically in FIG. 10. When oriented for use, the pillar 11 comprises an upper portion that is shaped to fit inside the coupling body 12, a mid-portion and a lower portion that is configured for engaging with the towbar loop 2. The upper portion has a male cylindrical section 20 that tapers inwardly at an uppermost part 21 thereof towards a partially flat upper surface 22. The upper surface includes a domed tip 23 at its centre. The mid-portion extends vertically beneath the male cylindrical section and comprises of a bevelled locking flange 18 that tapers sharply outwardly to a sharp lip 19 having a flat underside. The flat underside defines an upper surface of an annular latch retaining recess 16. The lower portion of the pillar 11 has a towbar engaging flange 14 that also defines a lower surface of the latch retaining recess 16. The towbar engaging flange 14 has a flat lower surface for resting on the towbar loop 2 in use. A lowermost part of the pillar 11 is an elongate cylindrical portion 13 adapted for insertion into the towbar loop 2.

The coupling body 12, seen in FIGS. 1, 1a, 3 and 4 has a female body with a generally cylindrical exterior surface 24 and an interior surface 25 which matches the surfaces of the bevelled locking flange 18 and male cylindrical section 20, including the tapered uppermost part 21, of the pillar 11 with a mating fit. The dimensions of the interior surface 25 are chosen to provide a small diametral clearance between the mating surfaces of the coupling body 12 and the pillar 11 so as to prevent the jamming of the coupling body 12 over the male sections 20, 21 of the pillar 11 when the coupling body 12 is placed over the pillar 11 during use. The coupling device 1 includes an annular base 15 that includes a pair of upwardly facing part-circumferential flanges 17 that support the coupling body 12 on the pillar 11.

The tapered uppermost portion 21 of the pillar 11 has the effect of promoting correct alignment between the conical surfaces of the coupling body 12 and the pillar 11 during insertion of the pillar 11 into the coupling body 1 during use.

The lower end of the pillar 11 is of a shape to allow both secure latching of the latching bar when engaged with the sharp lip 19 of the pillar 11, as well as being able to facilitate the insertion of the pillar 11 into the coupling body 12 when the latching bars 28a,28b are in a release position as will be described below. A locking mechanism provides for locking of the coupling body 12 to the pillar 11, either automatically as the coupling body 12 is lowered onto the pillar 11, or alternatively under the control of the operator. The locking mechanism includes a pair of locking devices in the form of latching bars 28a, 28b and a rotary operating cap 40 as well as features of the coupling body 12 itself. The coupling body 12 is assembled with its two latching bars 28a, 28b, whose function is to engage with a sharp lip feature 19 on the pillar 11. Once engaged, the latching bars 28a, 28b prevent the coupling body 12 from detaching from the pillar 11. Each latching bar 28a, 28b has a matching jaw feature at a lower end thereof which permits the lower end of the latch bar to be pushed outwards, compressing its particular latch bar preload coil spring 34a, 34b, by the sharp lip feature 19 of the pillar 11 to permit engagement of the coupling body 12 on the pillar 11. Once the latch bar jaw feature has passed the sharp lip feature 19, the preload coil springs 34a, 34b drive the latch bars 28a, 28b into a locked position on the pillar 11 and disengagement of the coupling body 12 from the pillar 11 is no longer possible.

The coupling body 12 includes an opposing pair of shallow recesses 27a,27b extending along the length of the exterior surface thereof, each of which is adapted for receiving one of the latching bars 28a,28b therein. The recesses 27a, 27b provide a space for the two latching bars 28a, 28b to reside, with the latching bar outer surfaces lying flush with the outer surface of the coupling body 12 when the locking mechanism is in a locked position, as will be hereinafter explained.

The latching bars 28a, 28b are generally flat bars that extend the vertical length of the coupling body 12 in use, each having a laterally extending upper lip 29a, 29b at an uppermost part thereof that extends toward the coupling body 12 once assembled thereto. The latching bars 28a, 28b also have a laterally extending sharp lower lip 30a, 30b at a lowermost part thereof that extends towards the coupling body 12 and which is sized to fit into the latch retaining recess 16 during use. When the coupling body 12 is fully engaged with the pillar 11 during use, the latching bars 28a, 28b pivot in the coupling body 12 to engage over the sharp lip 19 and into the latch retaining recess 16, preventing the coupling body thereafter from becoming disengaged from the recess 16 without operator intervention. The latching bars 28a, 28b furthermore have a laterally extending pivot pin housing 32 at a mid-section of the latching bar 28a, 28b. The pivot pin housings 32 are each reinforced to provide a hole there through for receiving a latching bar pivot pin 36 therein. Each latching bar 28a,28b is attached to the coupling body 12 with a respective one of the latching bar pivot pins 36. The latching bar pivot pins 36 can be inserted into and removed from four holes 38 provided in the coupling body 12 so as to extend through the recess 27a, 27b and the pivot pin housing 32 during assembly of the coupling device 1 to pivotably attach the latching bar 28a, 28b to the coupling body 12.

The latching bar pivot pin 36 permits the respective latching bar 28a, 28b to pivot about a horizontal axis defined by the pivot pin housing 32 between locked, unlocked and neutral or 'release' positions with respect to the pillar 11. In the locked position, the lower lip 30 of the respective latching bar 28a, 29b latches with a close mating fit into the latch retaining recess 16 beneath the locking flange 18. Each latching bar 28a, 28b is fitted with a latching bar biasing member in the form of a pre-load coil spring 34a, 34b at an upper end thereof, providing a force that biases the coupling body 12 outwards at its upper end, effectively forcing the lower lip 30 into the latch retaining recess 16. The upper lip 29 of each of the latching bars 28a, 28b includes a through hole 39 extending vertically there through, in which is received a bearing location pin 37a, 37b. The bearing location pins 37a, 37b each house a self-aligning ball bearing unit 31a,31b therein. The self-aligning ball bearing units 31a, 31b each include a ball bearing that interacts with the rotary operating cap 40 during use of the coupling device 1, such that rotation of the rotary operating cap 40 causes the latching bars 28a, 28b to be pivoted about their respective pivot pins 36a,36b to change their position between locked, unlocked and neutral positions.

The rotary operating cap 40 is user operable to pivot the latching bars 28a, 28b between the three different operating positions of the latching bars 28a, 28b—a first locked position in which the latching bars 28a, 28b are latched into the latch retaining recess 16 of the pillar 11, a second release or neutral position in which the latches 28a, 28b permit engagement, but not disengagement, of the coupling body 12 from the pillar 11, and a third unlocked position in which the latching bars 28a,28b are unlatched relative to the coupling body 12. The rotary operating cap 40 includes further features that prevent the latching bars 28a, 28b from being moved out of the locked position when the coupling body is fully engaged on the pillar 11, such that the coupling body 12 cannot be removed from the pillar 11.

The rotary cap 40 is a generally circular cap that can be rotated in a horizontal plane about a central rotary cap retaining pin 45 that sits on top of the domed tip 23 and upper surface 22 of the coupling body 12. The rotary operating cap 40 has an upper exterior surface 42 that is at least partly knurled or which has circumferential protrusions and recesses that facilitate easy gripping and/or the engagement of a dedicated matching hand tool to make easy the rotation of the rotary operating cap 40 by a person of limited manual strength. The rotary operating cap 40 can be rotated between three operating positions as will be described below.

The rotary operating cap 40 includes a central threaded bore 43 in an underside thereof for receiving a threaded shaft 44 of a rotary cap retaining pin 45 therein. The rotary cap retaining pin 45 has a generally inverse T-shape, the threaded shaft 44 being adapted for threadedly engaging the central bore 43 and a lower end comprising a circular plate 46, the underside 47 of which includes a concave circular recess that is the same size and shape as the domed tip 23 of the pillar 11. The rotary cap retaining pin 45 is therefore configured to contactingly engage the upper surface 22 and domed tip 23 of the pillar 11 as well as threadedly engage the rotary cap 40. In this manner, the rotary cap retaining pin 45 can rotate relative to the coupling body 12. A resilient member in the form of a Belleville spring 51 sits atop the circular plate 46 of the rotary cap retaining pin 45. The resilient member 51 is retained within the upper surface of the coupling body 12 such that it has a small amount of vertical travel in a gap 53 between an underside of the upper lip 29 of the coupling body 12 and the circular plate 46 of the rotary cap retaining pin 45. Accordingly, the rotary operating cap 40 is free to rise and fall a limited distance under the action of the resilient member 51. A ball thrust race 49 (seen in FIG. 9) pushes downwards when the pillar 11 is not engaged or is only partially engaged in the coupling body 12, and pushes upwardly as the pillar 11 is fully engaged within the coupling body 12 such that its domed tip 23 pushes upwards against the rotary cap retaining pin 45.

The rotary cap 40 has a pair of tracks or cam surfaces 54,55 formed in the underside thereof, for engaging the ball bearings 31a, 31b, fixed to the latching bars 28a,28b, therein. The cam surfaces 54, 55 are arranged on opposing sides of the threaded bore 43 in the underside of the rotary cap 40. They are approximately arc shaped arranged around the threaded bore 43 such that each is narrower at rounded extremities 56, 57 thereof than it is in the centre of the arc shape. Each arc shape is asymmetric, having a curved outer edge 58 that varies in its distance from the circumference of the rotary cap 40 and a curved inner edge 59 that varies in its distance from the threaded bore 43. More specifically, as viewed in FIG. 5, the rounded extremity 56 is closer to the threaded bore 43 than is the rounded extremity 57. The outer edge 58 of the cam surface or track 54 begins at the first rounded extremity 56 with a straight line angled towards the cap circumference before becoming curved to follow the curvature of the circumference of the rotary cap 40. Similarly, the rounded extremity 56 of the arc shape of the cam surface 55 is closer to the threaded bore 43 than is the rounded extremity 57 at the second end of the cam surface 55. The rounded extremities 56,57 are sized and shaped such that the ball bearings 31a,31b fit closely therein. The inner edge 59 of each of the cam surfaces 54, 55 includes a rounded corner adjacent the rounded extremity 57 such that the ball bearings 31a, 31b are unable to move radially whilst situated in the rounded extremities 57.

The rotary cap 40 is assembled onto the coupling body 12 such that the ball bearings 31a,31b, acting as cam followers, are engaged in the tracks or cam surfaces such that rotation of the rotary cap 40 causes movement of the ball bearings 31a,31b in the tracks with both angular and radial components of movement, to in turn cause pivoting of the latching bars 28a,28b as will now be described.

Rotation of the rotary cap 40 is used to move the cam followers 31a,31b between first, second and third angular operating positions within the cam surface or track 54,55 to pivot the latching bars between the locked position, the neutral or release position and the unlocked position.

Figure 6C:
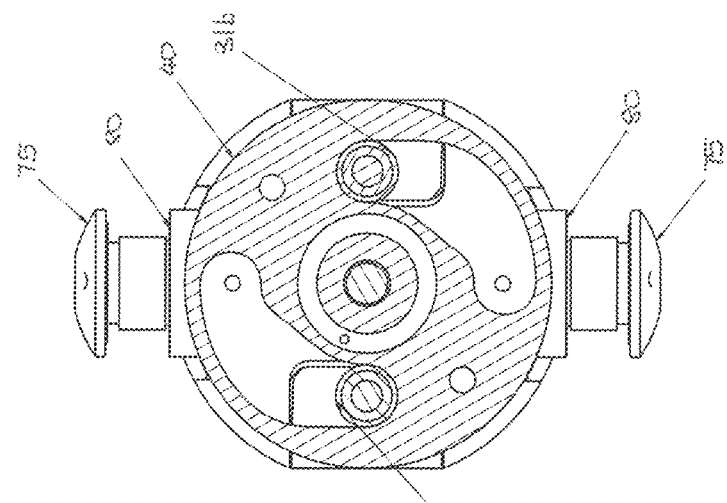
FIG. 6c is a horizontal sectional view through the rotary cap and latch, with the latch in the third, unlocked position.
Figure 6B:
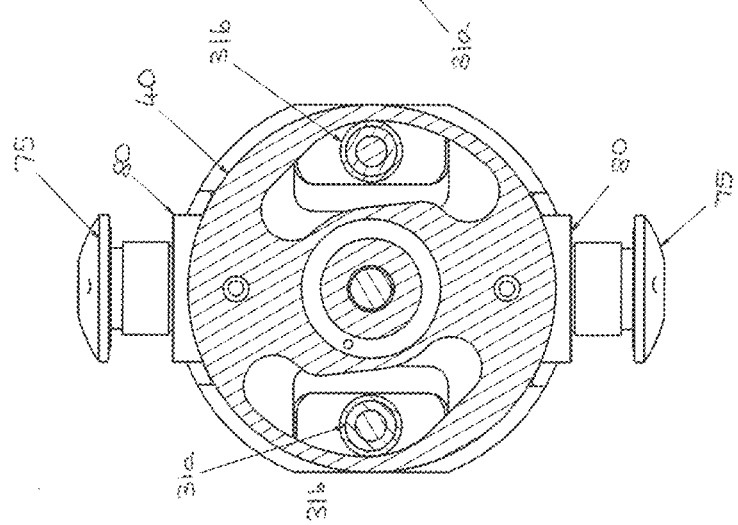
FIG. 6b is a horizontal sectional view through the rotary cap and latch, with the latch in the second, release position.
Figure 6A:
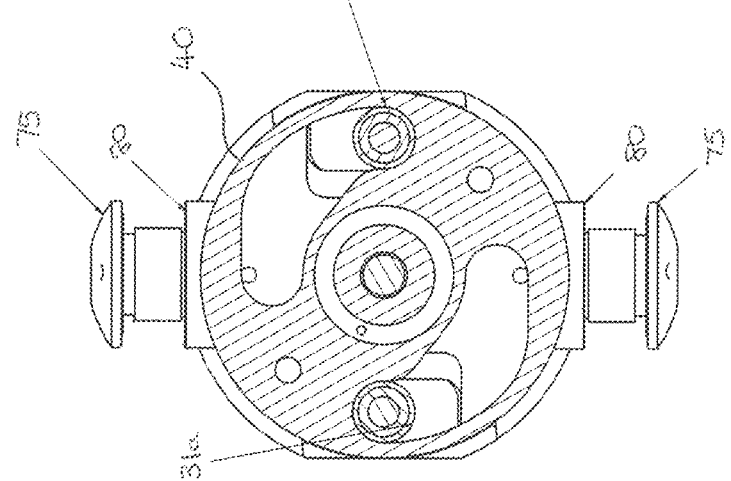
FIG. 6a is a horizontal sectional view through the rotary cap and latch, with the latch in the first, locked position.
Figure 8:
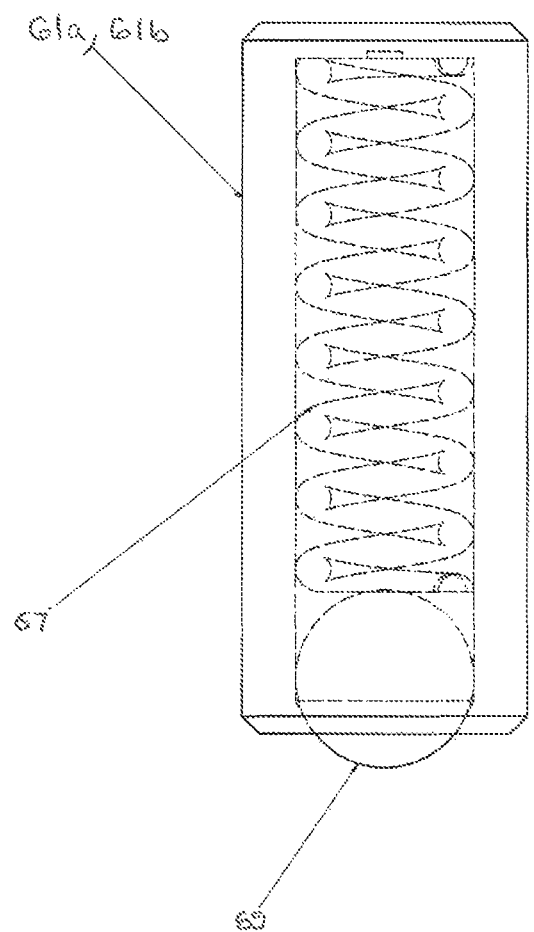
FIG. 8 is a vertical sectional view of a rotary cap detent spring unit of the coupling device.

The first angular operating position of the rotary operating cap 40 relative to the coupling body 12 is shown in FIG. 6a. It prevents disengagement of the pillar 11 from the coupling body 12 under any circumstances and therefore corresponds to the locked position of the latching bars 28a, 28b. In this configuration, the ball bearing 31a is engaged in the second narrow rounded extremity 57 of the cam surface/track 54 that is radially closest to the circumference of the rotary cap 40. The ball bearing 31b is similarly engaged in the narrow rounded extremity part 57 of the cam surface/track 55. Neither ball bearing 31a, 31b is able to move radially whilst engaged in the extremities 57. At this radius from the centre of the rotary cap 40, the upper ends of the latching bars 28a, 28b are biased outwardly away from the coupling body 12, which prevents the latching bars 28a,28b from pivoting about their pivot pins 36a, 36b away from the locked position to the release position. In use when the coupling device 1 is installed onto the pillar 11, in this configuration of the rotary operating cap 40, the operator is unable to engage or disengage the coupling body 12 from the pillar 11.

The second angular operating position of the rotary operating cap 40 relative to the coupling body 12 is shown in FIG. 6b and permits engagement, but not disengagement of the pillar 11 from the coupling body 12 and therefore corresponds to the release position of the latching bars 28a, 28b. In this configuration, the ball bearings 31a,31b are not restricted in their ability to move radially inwards within the tracks such that there is no engagement of the ball bearings 31a,31b and hence of the upper end of the latching bars 28a,28b within the rotary operating cap 40. This state permits the latching bars 28a, 28b to pivot freely about their pivot pins 36a, 36b, towards either the release or lock positions, however the preload coil springs 34a,34b bias each latching bar 28a, 28b towards the locked position. In this configuration, movement of the pillar 11 can force apart the latching bars 28a, 28b about their pivot pins 36a,36b, enabling an operator to engage the coupling body 12 onto the pillar 11 using downward motion and some moderate force of the coupling body 12 onto the pillar 11, but not to then disengage the coupling body 12 from the pillar 11.

The third angular operating position of the rotary operating cap 40 relative to the coupling body 12 is shown in FIG. 6c and permits ready engagement of the pillar 11 to the coupling body 12 using minimal downwards force of the coupling body 12 onto the pillar 11. In this configuration, the ball bearings 31a, 31b are engaged in the narrow extremities 56 of the cam surfaces/tracks that are radially distant from the circumference of the rotary cap 40, biasing the upper ends of the latching bars 28a, 28b inwards towards the coupling body 12, which pivots the latching bars 28a,28b about their pivot pins 36a, 36b away from the locked position and towards the release/unlocked position. The operator is able to engage or disengage the coupling body 12 from the pillar 11 without needing to apply any moderate downwards or upwards forces on the coupling body 12.

The rotary cap 40 further includes a shallow annular recess 60 in the underside thereof, between the cam surfaces 54,55, that houses a resilient biasing member in the form of a rotary cap torsion spring 62. The rotary cap torsion spring 62 is a helical spring that is attached at one end thereof to the recess 60 and at the other end to the coupling body 12, having the effect that the spring 62 is able to exert torque at all times on the rotary cap 40 relative to the coupling body 12, biasing the rotary cap towards the first operating position thereof.

Figure 9:
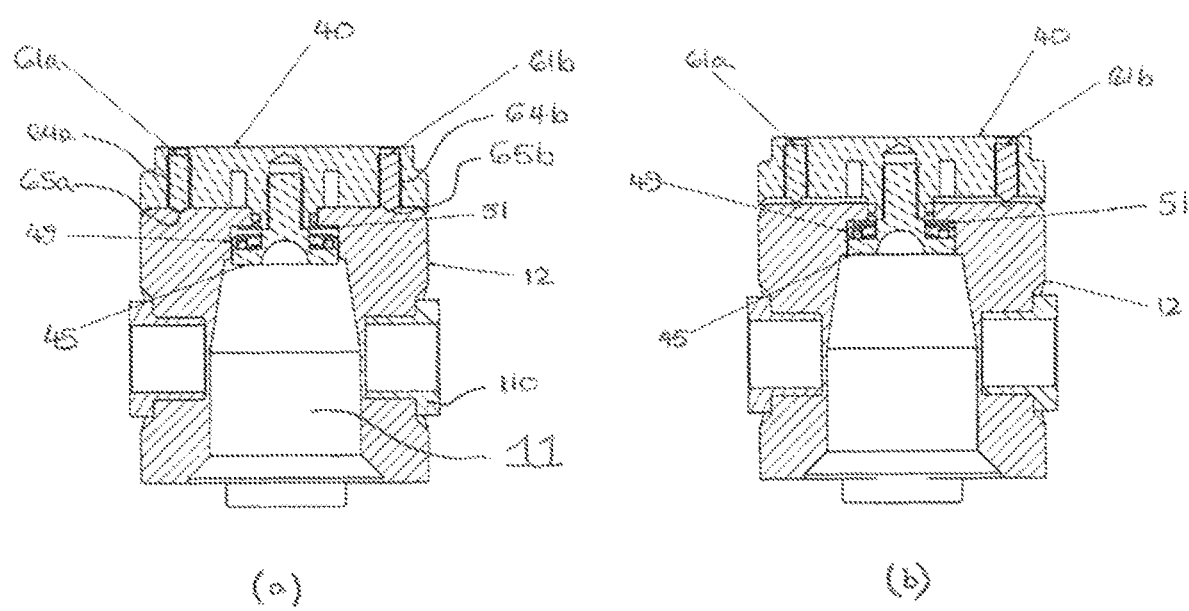
FIG. 9a is a sectional view of the rotary cap in a lowered position showing ball detent units engaged in the coupling body.
FIG. 9b is a sectional view of the rotary cap in a raised position under the action of a ball thrust race and resilient member.

As seen in FIG. 9, two further small circular recesses 64a, 64b in opposing sides of the underside of the rotary cap 40 allow for the fitting of two rotary cap detent ball units 61a, 61b. Each rotary cap detent ball unit 61a, 61b has a hollow right cylindrical housing with a circular aperture in a lower end thereof, see FIG. 8. Inside the housing resides a helical spring 67 and a ball 69. The helical spring 67 is arranged above the ball 69 so as to bias the ball 69 such that it protrudes out of the lower end aperture. Two shallow rounded detents 65a,65b are present in the upper surface of the coupling body 12. When the balls 69 of the detent ball units 61a,61b are engaged in the detents 65a,65b, the rotary cap detent ball units 61a,61b prevent rotation of the rotary cap 40 relative to the coupling body 12 against the torque provided by the rotary cap torsion spring 62. However, when the pillar 11 is fully engaged with the coupling body 12, the domed tip 23 of the pillar 11 lifts the rotary cap 40 through the rotary cap ball thrust race 49 against the action of the rotary cap Belleville spring 51 such that the balls 69 of the detent ball units 61a,61b are lifted out of the detents 65a,65b. At this time, the rotary operating cap 40 is able to rotate freely past the detents 65a,65b towards the first operating position.

In addition to the three rotary operating positions of the rotary operating cap 40 described above, there are two vertical operating positions of the rotary operating cap 40 relative to the coupling body 12; a first downward position and a second lifted position. In the first, downward position of the rotary cap 40, which is the default position due to the action of the rotary cap Belleville spring 51, the rotary operating cap 40, when rotated by an operator towards the third angular position, as described above, will be retained in that position due to the engagement of the balls 69 in the underside of the rotary cap 40 with the coupling body 12.

The rotary cap torsion spring 62 installed between the rotary operating cap 40 and the coupling body 12 is pre-loaded so as to always rotate the rotary cap 40 in a rotation direction towards the first position from the second and third positions as described above. However, the rotary cap detent ball units 61a, 61b, when engaged with the detents 65a, 65b, will prevent the rotary operating cap 40 from rotating under the influence of the rotary cap torsion spring 62 and the rotary cap will be locked in the first operating position.

As the pillar 11 is engaged into the coupling body 12, and the coupling body 12 is lowered fully by the operator downwards into full engagement with the pillar 11, the domed tip 23 of the upper surface 22 surface of the pillar 11 has the effect of lifting the rotary operating cap 40 upwards from the said coupling body, by compressing the rotary cap Belleville spring 51 against the rotary cap ball thrust race 49, thereby lifting the rotary cap 40 to its raised position and then releases the rotary cap spring detent ball units 61a, 61b from engagement with the coupling body 12, allowing the rotary cap torsion spring 62 to drive the rotary cap 40 from the second operating position and the third operating position to the first operating position, i.e. the locked rotary position.

Operation of the coupling device 1 is as follows. When is it desired to attach a first towed vehicle to a second towed vehicle, the pillar 11 is inserted into the tow loop 2 of the first vehicle. The operator then places the coupling body 12 over the pillar 11. Initially, the rotary operating cap 40 is in the second or third operating position thereof so that the latches 28a, 28b are unlocked and the operator is able to push the coupling body 12 over the pillar, either with no force required if the rotary cap 40 is in the third operating position, or with some force required if the rotary cap 40 is in the second operating position. Once the coupling body 12 is fully engaged over the pillar 11, the domed tip 23 of the pillar 11 pushes the rotary cap retaining pin 45 upward to act on the Belleville spring 51 and ball thrust race 49 which release the balls 69 of the ball spring detent units 61a,61b from their corresponding detents 65a, 65b. The rotary cap torsion spring 62 causes the rotary cap 40 to rotate from the second or third operating position to the first operating position. The ball bearings 31a, 31b accordingly move along the cam surfaces 54, 55 to close the latches 28a, 28b, auto-locking the coupling device 1 in the locked position. The pre-load coil springs 34a, 34b of the latches 28a,28b biases them in the locked position such that the coupling body 12 cannot be disengaged from the pillar 11 without further operator intervention.

If it is required to uncouple or unlock the coupling body 12 from the pillar 11, the operator must rotate the rotary cap 40 against the helical spring 62 to again release the balls 69 from the detents 65a, 65b and to place the rotary cap 40 into the second or third operating positions in which the latches 28a, 28b are no longer biased into the locked position but can unlatch from the pillar sharp lip 19 to allow relative movement between the coupling body 12 and the pillar 11.

Referring to FIG. 1, the primary axis assembly 10 connects to the secondary axis assembly 100 via a yoke connector 110. A pair of opposing laterally placed threaded holes 70 in the exterior of the coupling body 12, located orthogonally to the latching bars 28a,28b, provide rotational axes for the yoke connector 110 of the secondary axis assembly 100. Connecting yoke pivot pins 75 and associated bushings 80 connect the coupling body 12 to the yoke connector 110 to allow vertical (pitch) articulation of the second towed vehicle with respect to the first towed vehicle. The yoke connector 110 is attached to an elongate rod 115 that operatively connects with the tertiary axis assembly 200. The tertiary axis assembly 200 has a hitch body 210 that is attachable to the chassis of the second towed vehicle using known means such as bolts. The hitch body 210 includes a bore 212 that receives a sleeve 215 therein. The sleeve 215 itself receives the elongate rod 115 of the secondary axis assembly 100 such that the yoke connector 110 is able to rotate relative to the hitch body 210.

Accordingly, this disclosure provides a coupling device 1 for coupling a first towing vehicle 400 to a second towed vehicle 500, the coupling device 1 including a pillar 11 for mounting to the tow loop 2 of a first vehicle 400, a coupling body 12 which engages with the pillar 11 by fitting over the pillar 11, and the yoke connector 110 linking the coupling body 12 to the second vehicle 500 via the hitch body 210 attached to the second vehicle 500. The primary axis assembly 10 of the coupling device 1 allows the automatic locking, without human intervention, of the coupling body 12 to the pillar 11 by means of the latching bars 28 engaging over the sharp lip feature 19 of the pillar, so as to prevent subsequent separation without further human input. The latching bars 28 can be held in a lock, release or free position by appropriate rotation of the rotary cap 40 and the pivoting action of the rotary cap 40 on the latching bars 28 by means of the spherical bearings 31a, 31b on top of each said latching bar 28. Accordingly, the coupling device 1 provides for both primary locking of the coupling body 12 to the pillar 11 and secondary locking of the primary locking mechanism via the rotary cap 40.

The rotary cap 40 is held in the coupling release position by the action of the rotary cap ball detent units 61a, 61b, until such time as the pillar 11 is introduced fully upwards into the coupling body 12 and the rotary cap 40 is lifted against the action of the rotary cap Belleville spring 51, by the upwards movement of the domed tip 23 of the pillar 11 on the rotary cap pin 45.

The rotary cap 40, when lifted, is able to be rotated by the action of the rotary cap torsion spring 62 which is engaged in both the rotary cap 40 and the coupling body 12, the torsion spring 62 being preloaded on assembly so as to be able to exert a torque sufficient to rotate the rotary cap 40 and thus drive both latching bars 28 to the locked position, making the coupling device self-locking.

Articulation between the two vehicles is provided by the following means:

Rotation of the second vehicle about the pillar 11 in the horizontal plane (yaw) is permitted by the rotation of the coupling body 12 around the vertical axis of the pillar 11.

Rotation of the second vehicle about the pillar 11 in the vertical plane (pitch) is allowed by the rotation of the yoke shaped connector 110 about the coupling body 12 about a horizontal axis at right angles to a longitudinal axis of the second vehicle.

Rotation of the second vehicle about the pillar 11 in the vertical transverse plane (roll) is allowed by the rotation of the yoke shaped connector about the hitch body 210 about a horizontal axis parallel to the longitudinal axis of the second vehicle.

In general, all of the major components of this invention could be made of carbon or stainless steel as selected by the manufacturer. The yoke bushes 80 would generally be made of a bronze bearing alloy. The pillar 11 is required to be made of carbon alloy steel grade AISI 4140 or equal, heat treated appropriately to meet the Australian Standard for Tow Balls and Australian Design Rule 62/02 titled "Mechanical Connections Between Vehicles".

According to some embodiments, a coupling device for coupling a first towing vehicle to a second towed vehicle includes a pillar or post for mounting to the first vehicle, said post having a tapered upper body, a parallel lower body, a domed portion at the centre of the upper surface, and a sharp lip feature below the tapered portion immediately above a parallel threaded section used to retain the post to the first vehicle; a coupling body which fits over and engages closely with the post; a pair of latching bars which pivot about their respective pivot pins within the coupling body and can engage with the post; a pair of latching bar coil preload springs which each engage in the coupling body and its respective latching bar; a pair of latching bar spherical bearings, each of which are fixed to the upper surface of its respective latching bar by means of a spherical bearing retaining pin and each engaging in a rotary operating cap; the rotary operating cap being located above and held against the coupling body by means of the rotary cap pin and its associated rotary cap Belleville washer and a rotary cap ball thrust race; a pair of rotary cap detent ball units, which are positioned within recesses in the rotary cap and can engage with matching recesses in the upper surface of the coupling body so as to inhibit rotary motion of the rotary cap when thus engaged; a pair of yoke pins and their associated pivot bushings which engage with a connecting yoke and are fixed into the coupling body by means of matching screw threads in the said pins and said coupling body; the connecting yoke connects the coupling body to a hitch body, allowing a degree of articulation by means of the yoke pivot pins; a yoke shaft that connects the connecting yoke to the hitch body, and the shaft is able to rotate in the hitch body allowing a degree of articulation of connecting yoke to hitch body; the hitch body is fixed to the second towed vehicle and allows rotation of the yoke shaft within its central bore.

In embodiments, the coupling device further allows the automatic locking, without human intervention, of the coupling body to the post by means of the latching bars engaging over the sharp lip feature of the post, so as to prevent subsequent separation without further human input.

In embodiments, the latching bars can be held in a lock, release or free position by appropriate rotation of the rotary cap and the pivoting action of the rotary cap on the latching bars by means of the spherical bearings on top of each said latching bar.

In embodiments, the rotary cap is held in the coupling release position by the action of the rotary cap ball detent units, until such time as the post is introduced fully upwards into the coupling body and the rotary cap is lifted against the action of the rotary cap Belleville spring, by the upwards movement of the domed tip of the post on the rotary cap pin.

In embodiments, the rotary cap, when lifted, is able to be rotated by the action of a rotary cap torsion spring which is engaged in both the rotary cap and the coupling body, the torsion spring preloaded on assembly so as to be able to exert a torque sufficient to rotate the cap and thus drive both latching bars to the latching position, making the coupling device self-locking.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A coupling device for coupling a first vehicle to a second towed vehicle, the coupling device comprising:
    a pillar for mounting to a towbar of the first vehicle, the pillar defining a primary longitudinal axis and including an upper portion, a lower portion adapted for engagement with the towbar of the first vehicle, and an intermediate portion including a radially protruding locking flange,
    a coupling body adapted for sleeved engagement with the upper portion of the pillar, the coupling body including at least one locking device for locking the coupling body to the locking flange of the pillar,
    and a rotary cap operatively associated with the at least one locking device and adapted for rotation relative to the coupling body, whereby rotation of the rotary cap causes the at least one locking device to pivot between at least a locked position in which the coupling body is prevented from disengaging from the locking flange of the pillar and an unlocked position in which the coupling device is free to disengage from the locking flange of the pillar,
    wherein the at least one locking device is a latch having an upper portion configured for engagement with the rotary cap and a lower portion configured for selective locking engagement with the locking flange of the pillar, the latch being pivotably attached to the coupling body for movement between at least the locked position and the unlocked position upon rotation of the rotary cap.

2. A coupling device as claimed in claim 1, wherein the rotary cap includes an upper surface and an opposing lower surface, and at least one cam surface in the lower surface thereof, the at least one cam surface adapted for receiving therein a cam follower associated with the at least one locking device for movement of the cam follower within the at least one cam surface upon rotation of the rotary cap to move the at least one locking device between at least the locked position and the unlocked position.

3. A coupling device as claimed in claim 2, wherein the at least one locking device includes a cam follower adapted to move within the cam surface of the rotary cap upon rotation thereof to move the at least one locking device between at least the locked and unlocked positions.

4. A coupling device as claimed in claim 3, wherein the cam follower is a ball bearing.

5. A coupling device as claimed in claim 1 wherein the at least one locking device comprises a pair of the said locking devices.

6. A coupling device as claimed in claim 1, wherein the at least one locking device has a release position in between the locked position and the unlocked position, in which position the at least one locking device is engageable with the locking flange but cannot be disengaged therefrom.

7. A coupling device as claimed in claim 6, wherein the at least one locking device includes a biasing member for biasing the at least one locking device towards the locked position when the locking device is in the release position.

8. A coupling device as claimed in claim 1, wherein the coupling body is generally annular and has a female inner surface adapted for receiving the pillar therein with a substantially mating fit, and wherein the coupling body comprises a helical resilient member having a first end attached to the rotary cap and a second end attached to the coupling body for biasing the rotary cap in the locked position; whereby the rotary cap is rotatable to the locked position with respect to the coupling body under the influence of the helical resilient member and without user input only when the pillar is fully engaged within the female inner surface of the coupling body.

9. A coupling device as claimed in claim 8, wherein an upper surface of the coupling body includes at least one detent therein and the rotary cap includes at least one protrusion for selective engagement with the detent, whereby when the pillar is not fully engaged within the female inner surface of the coupling device, the protrusion is engaged in the detent preventing rotational movement of the rotary cap and, as the pillar is fully engaged within the female inner surface of the coupling body, the protrusion is caused to disengage from the detent permitting the rotational movement of the rotary cap.

10. A coupling device as claimed in claim 9, wherein the pillar includes a domed portion in an upper surface thereof that is operatively associated with the rotary cap, and the coupling device includes a resilient member adapted for biasing the protrusion of the rotary cap in the detent, wherein as the pillar is fully engaged within the female inner surface of the coupling body, the domed portion causes the compression of the resilient member so as to lift the protrusion sufficiently out of the detent to disengage it therefrom.

11. A coupling device as claimed in claim 1, further including a yoke connector pivotably connected to the coupling body to permit pitching movement of the second towed vehicle relative to the first vehicle about a secondary axis that is perpendicular to the primary longitudinal axis of the pillar.

12. A coupling device as claimed in claim 11, further including an elongate rod connected to the yoke connector and a hitch body for connection to the second towed vehicle, wherein the elongate rod is operatively associated with the hitching body for rotational movement relative thereto about a tertiary axis that is perpendicular to both the primary and secondary axes, to permit rolling movement of the second vehicle about the tertiary axis.

13. A coupling device for coupling a first vehicle to a second towed vehicle, the coupling device comprising:
   a pillar for mounting to a towbar of the first vehicle, the pillar defining a primary longitudinal axis and including an upper portion, a lower portion adapted for engagement with the towbar of the first vehicle, and an intermediate portion including a radially protruding locking flange,
   a coupling body adapted for sleeved engagement with the upper portion of the pillar, the coupling body including at least one locking device for locking the coupling body to the locking flange of the pillar,
   and a rotary cap operatively associated with the at least one locking device and adapted for rotation relative to the coupling body, whereby rotation of the rotary cap causes the at least one locking device to pivot between at least a locked position in which the coupling body is prevented from disengaging from the locking flange of the pillar and an unlocked position in which the coupling device is free to disengage from the locking flange of the pillar,
   wherein the coupling body is generally annular and has a female inner surface adapted for receiving the pillar therein with a substantially mating fit, and wherein the coupling body comprises a helical resilient member having a first end attached to the rotary cap and a second end attached to the coupling body for biasing the rotary cap in the locked position; whereby the rotary cap is rotatable to the locked position with respect to the coupling body under the influence of the helical resilient member and without user input only when the pillar is fully engaged within the female inner surface of the coupling body.

14. A coupling device as claimed in claim 13, wherein an upper surface of the coupling body includes at least one detent therein and the rotary cap includes at least one protrusion for selective engagement with the detent, whereby when the pillar is not fully engaged within the female inner surface of the coupling device, the protrusion is engaged in the detent preventing rotational movement of the rotary cap and, as the pillar is fully engaged within the female inner surface of the coupling body, the protrusion is caused to disengage from the detent permitting rotational movement of the rotary cap.

15. A coupling device as claimed in claim 14, wherein the pillar includes a domed portion in an upper surface thereof that is operatively associated with the rotary cap, and the coupling device includes a resilient member adapted for biasing the protrusion of the rotary cap in the detent, wherein as the pillar is fully engaged within the female inner surface of the coupling body, the domed portion causes the compression of the resilient member so as to lift the protrusion sufficiently out of the detent to disengage it therefrom.

16. A coupling device as claimed in claim 13, wherein the rotary cap includes an upper surface and an opposing lower surface, and at least one cam surface in the lower surface thereof, the at least one cam surface adapted for receiving therein a cam follower associated with the at least one locking device for movement of the cam follower within the at least one cam surface upon rotation of the rotary cap to move the at least one locking device between at least the locked position and the unlocked position.

17. A coupling device as claimed in claim 16, wherein the at least one locking device includes a cam follower adapted to move within the cam surface of the rotary cap upon rotation thereof to move the at least one locking device between at least the locked and unlocked positions.

18. A coupling device as claimed in claim 13, wherein the at least one locking device comprises a pair of the said locking devices.

19. A coupling device as claimed in claim 13, wherein the at least one locking device has a release position in between the locked position and the unlocked position, in which position the at least one locking device is engageable with the locking flange but cannot be disengaged therefrom.

20. A coupling device as claimed in claim 19, wherein the at least one locking device includes a biasing member for biasing the at least one locking device towards the locked position when the locking device is in the release position.

* * * * *